(12) United States Patent
Kang

(10) Patent No.: US 8,014,527 B2
(45) Date of Patent: Sep. 6, 2011

(54) APPARATUS AND METHOD FOR REUSING PAIR OF PUBLIC AND PRIVATE KEYS

(75) Inventor: Seong-min Kang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1211 days.

(21) Appl. No.: 10/931,053

(22) Filed: Sep. 1, 2004

(65) Prior Publication Data

US 2005/0058295 A1 Mar. 17, 2005

(30) Foreign Application Priority Data

Sep. 1, 2003 (KR) ................. 10-2003-0060756

(51) Int. Cl.
  *H04K 1/00* (2006.01)
  *H04L 9/00* (2006.01)
  *H04L 9/08* (2006.01)
  *H04L 9/32* (2006.01)
(52) U.S. Cl. ......... 380/273; 380/282; 380/285; 713/168
(58) Field of Classification Search .................. None
  See application file for complete search history.

(56) References Cited

U.S. PATENT DOCUMENTS

| | | | |
|---|---|---|---|
| 5,201,000 A | 4/1993 | Matyas et al. | |
| 5,841,865 A * | 11/1998 | Sudia | 380/286 |
| 6,026,167 A | 2/2000 | Aziz | |
| 6,157,722 A | 12/2000 | Lerner et al. | |
| 6,263,437 B1 * | 7/2001 | Liao et al. | 713/169 |
| 6,490,352 B1 | 12/2002 | Schroeppel | |
| 6,915,437 B2 * | 7/2005 | Swander et al. | 726/1 |
| 6,976,177 B2 * | 12/2005 | Ahonen | 726/3 |
| 7,043,633 B1 * | 5/2006 | Fink et al. | 713/162 |
| 7,245,724 B1 * | 7/2007 | Chesson et al. | 380/270 |
| 2003/0123672 A1 * | 7/2003 | Srinivasan et al. | 380/285 |
| 2003/0149880 A1 * | 8/2003 | Shamsaasef et al. | 713/182 |
| 2004/0006701 A1 * | 1/2004 | Kresina et al. | 713/189 |
| 2004/0088537 A1 * | 5/2004 | Swander et al. | 713/153 |

FOREIGN PATENT DOCUMENTS

| | | |
|---|---|---|
| EP | 1 063 813 A2 | 12/2000 |
| JP | 2002-232413 | 8/2002 |
| KR | 10-2004-0031151 | 4/2004 |

OTHER PUBLICATIONS

Korean Office Action issued Nov. 23, 2011 in corresponding Korean Patent Application 10-2003-0060756.

* cited by examiner

*Primary Examiner* — Nasser Moazzami
*Assistant Examiner* — Fatoumata Traore
(74) *Attorney, Agent, or Firm* — Staas & Halsey LLP

(57) ABSTRACT

An apparatus and method that reuse a pair of public and private keys. The method includes determining whether a pair of public and private keys that have already been used in a first encryption process are still usable; and reusing the pair of public and private keys in a second encryption process if the pair of public and private keys are determined as being reusable. Accordingly, it is possible to considerably reduce the amount of computation and time that is generally required to calculate a pair of public and private keys, by allowing the pair of public and private keys to be reused.

23 Claims, 15 Drawing Sheets

|  | OTHER HOST ID | | | | |
|---|---|---|---|---|---|
| PAIR 1 OF PUBLIC AND PRIVATE KEYS | IP1 | IP2 | | | |
| PAIR 2 OF PUBLIC AND PRIVATE KEYS | IP3 | IP4 | IP1 | | |
| . . . | | | | | |
| PAIR 5 OF PUBLIC AND PRIVATE KEYS | IP5 | | | | |

| | OTHER HOST ID | | | | |
|---|---|---|---|---|---|
| PAIR 1 OF PUBLIC AND PRIVATE KEYS | IP1 | IP2 | IP3 | IP4 | IP5 |
| PAIR 2 OF PUBLIC AND PRIVATE KEYS | IP6 | IP7 | IP8 | IP9 | IP10 |
| ... | | | | | |
| PAIR 5 OF PUBLIC AND PRIVATE KEYS | IP11 | IP12 | IP13 | IP14 | IP15 |

| | OTHER HOST ID | | | | |
|---|---|---|---|---|---|
| PAIR 1 OF PUBLIC AND PRIVATE KEYS | IP1 | IP2 | IP3 | IP4 | IP5 |
| PAIR 6 OF PUBLIC AND PRIVATE KEYS | | | | | |
| ... | | | | | |
| PAIR 5 OF PUBLIC AND PRIVATE KEYS | IP11 | IP12 | IP13 | IP14 | IP15 |

| | OTHER HOST ID | | | | |
|---|---|---|---|---|---|
| PAIR 1 OF PUBLIC AND PRIVATE KEYS | IP1 | IP2 | IP3 | IP4 | IP5 |
| PAIR 2 OF PUBLIC AND PRIVATE KEYS | IP6 | IP7 | IP8 | | |
| . . . | | | | | |
| PAIR 5 OF PUBLIC AND PRIVATE KEYS | IP11 | IP12 | | | |

| | OTHER HOST ID | | | | |
|---|---|---|---|---|---|
| PAIR 6 OF PUBLIC AND PRIVATE KEYS | | | | | |
| PAIR 2 OF PUBLIC AND PRIVATE KEYS | | | | | |
| . . . | | | | | |
| PAIR 5 OF PUBLIC AND PRIVATE KEYS | IP11 | IP12 | IP13 | IP14 | IP15 |

APPARATUS AND METHOD FOR REUSING PAIR OF PUBLIC AND PRIVATE KEYS

CROSS-REFERENCE TO RELATED APPLICATIONS

This application claims the priority of Korean Patent Application No. 2003-60756, filed on Sep. 1, 2003 in the Korean Intellectual Property Office, the disclosure of which is incorporated herein in its entirety by reference.

BACKGROUND OF THE INVENTION

1. Field of the Invention

The present invention relates to Internet Key Exchange (IKE), which is a protocol for generating an encryption key for an IP Security Protocol (IPsec), and more particularly, to a Diffie-Hellman key agreement.

2. Description of the Related Art

FIG. 1 is a diagram illustrating a conventional method of securing Internet communications according to IP Security Protocol (IPsec). IPsec is a communications protocol that guarantees the security of Internet communications. IPsec, which is loaded onto an IP layer, for example, a third layer of a reference model, enables two hosts, which are willing to communicate with each other through the Internet, to transmit or receive secured data to/from each other. The format of encryption or authentication according to IPsec is called Security Association (SA). IPsec uses Internet Key Exchange (IKE), which is a mixture of Internet Security Association & Key management Protocol (ISAKMP), Oakley, and Secure Key Exchange MEchanism (SKEME), to generate an encryption key. IKE adopts a packet format appropriate for key exchange and key authentication from ISAKMP, a key exchange mode from Oakley, and a method of encrypting a public key from SKEME.

Referring to FIG. 1, an encryption key is generated on an application layer of an open systems interconnection (OSI) reference model according to IKE. This type of method to generate an encryption key according to IKE can be divided into two different phases, i.e., a first phase in which an IKE encryption key is generated and a second phase in which an IPsec encryption key is generated. The first phase is implemented to protect the second phase. In the first phase, SA having an ISAKMP format (i.e., ISAKMP SA) is generated. The second phase is implemented to protect the IPsec communications. In the second phase, (Ipsec SA) ISAKMP SA is generated. IPsec SA is used to protect data transmitted to another host. Such protected data is transmitted to the other host in the form of (data)IPsec SA passing through an IPsec tunnel.

FIG. 2 is a flowchart of the first phase of the conventional method of generating an IKE encryption key. Referring to FIG. 2, a public key and a private key, which serve as factors in calculating an IKE encryption key, are renewed whenever the IKE encryption key is calculated, in order to guarantee perfect forward secrecy (PFS) of the IKE encryption key. PFS means that previous encryption keys will never be disclosed even though a current encryption key is accidentally disclosed.

FIG. 3 is a flowchart of the second phase of the conventional method of generating an IKE encryption key. Referring to FIG. 3, a public key and private key are renewed whenever a packet 30 is transmitted for calculating an IPsec encryption key. As described above, in both the first and second phases, the public key and the private key should be periodically renewed. In the process of renewing the public key and the private key, a Diffie-Hellman key agreement protocol is used for key agreement.

FIG. 4 is a diagram illustrating a conventional method of generating an encryption key according to the Diffie-Hellman key agreement protocol. Referring to FIG. 4, two hosts have private keys $X_i$ and $X_j$, respectively, that will never be disclosed. The private keys $X_i$ and $X_j$ are prime numbers. Each of the two hosts has a public key $Y_i$ or $Y_j$, which are disclosed in the process of being transmitted between the two hosts. The public key $Y_i$ or $Y_j$ is calculated by substituting the private key $X_i$ or $X_j$ into a corresponding equation shown in FIG. 4. Then, the two hosts exchange their public keys $Y_i$ and $Y_j$. Thereafter, each of the hosts calculates a shared key K by substituting the public key $Y_i$ or $Y_j$ that it receives from the other host and its own private key $X_i$ or $X_j$ into a corresponding equation shown in FIG. 4. Thereafter, an encryption key is generated using the shared key K. However, since the equations used to calculate the public keys $Y_i$ and $Y_j$ contain an exponential function, the number resulting from the calculation is very large, and accordingly, because of the complex calculations required, it takes a while to obtain the public keys $Y_i$ and $Y_j$ and their respective shared keys.

FIG. 5 is a diagram illustrating problems of the conventional method of generating an IKE encryption key. More specifically, FIG. 5 illustrates three different scenarios. The left portion of FIG. 5 illustrates a case where the period of connecting two hosts is longer than the period of renewing an encryption key. In this case, the encryption key is periodically renewed (i.e., key 1 is renewed to key 2) while a connection 1 between the two hosts is maintained, and thus, PFS is guaranteed. The middle portion of FIG. 5 illustrates a case where the period of connecting the two hosts is shorter than the period of renewing the encryption key. In this case, a previous encryption key, key 1', is kept valid without being renewed even after the connection between two hosts is reset (i.e., connection 1' and connection 2'), and thus, PFS cannot be guaranteed. Therefore, in order to guarantee PFS, the period of renewing the encryption key should be shortened. However, the shorter the period of renewing the encryption key, the higher the frequency of calculating public keys and the larger the work load for each of the hosts.

The right portion of FIG. 5 illustrates the next version of IKE, i.e., IKEv2. IKEv2 adopts an algorithm, in which an encryption key, Key 1''' is maintained as long as a connection between the two hosts is maintained and is renewed whenever the connection between the two hosts is reset. In this case, whenever the connection between the two hosts is reset, public keys (i.e., connection 1'' and connection 2'') key 1'' and key 2'' of the two hosts should be recalculated, which results in an increasing workload for each of the two hosts.

SUMMARY OF THE INVENTION

In accordance with an aspect of the present invention, apparatuses and methods that can considerably reduce an amount of computation and time that used to be required in the conventional art to generate a pair of public and private keys, by allowing the pair of public and private keys to be reused to calculate a shared key, are provided. In addition, the apparatus and method can guarantee perfect forward secrecy (PFS) by preventing the pair of public and private keys from being reused by a host that has already used the pair of public and private keys.

According to an aspect of the present invention, there is provided a method of reusing a pair of public and private keys, which is performed in a host. The method includes determining whether a pair of public and private keys that have already been used in a first encryption process are still usable; and reusing the pair of public and private keys in a second encryption process if the pair of public and private keys are determined as being reusable.

According to another aspect of the present invention, there is provided an Internet key exchange (IKE) initiation method, which is performed in a host. The IKE initiation method includes receiving a first packet having a key exchange payload from an other host, a public key included in a pair of Diffie-Hellman keys being recorded in the key exchange payload; and calculating an IKE encryption key based on the public key recorded in the key exchange payload of the first packet if the pair of Diffie-Hellman keys are determined as being reusable.

According to another aspect of the present invention, there is provided an IKE response method, which is performed in a host. The IKE response method determining whether a pair of Diffie-Hellman keys that have already been used in calculating a shared key are reusable and then reading the pair of Diffie-Hellman keys if the pair of Diffie-Hellman keys are determined as being reusable; and calculating an IKE encryption key based on the read pair of Diffie-Hellman keys.

According to another aspect of the present invention, there is provided a computer-readable recording medium, on which a program enabling the method of reusing a pair of public and private keys is recorded.

According to another aspect of the present invention, there is provided a computer-readable recording medium, on which a program enabling the IKE initiation method is recorded.

According to another aspect of the present invention, there is provided a computer-readable recording medium, on which a program enabling the IKE response method is recorded.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
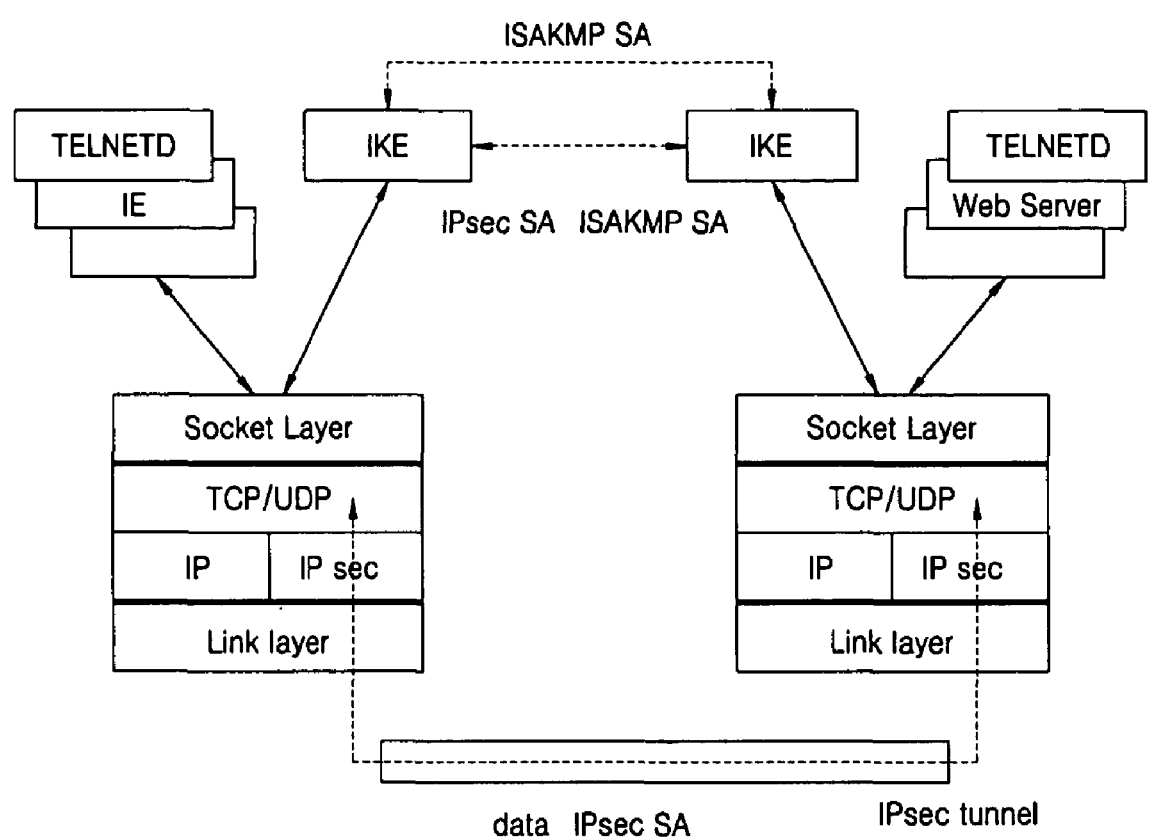
FIG. 1 is a diagram illustrating a conventional method of securing Internet communications according to IPsec.
Figure 2:
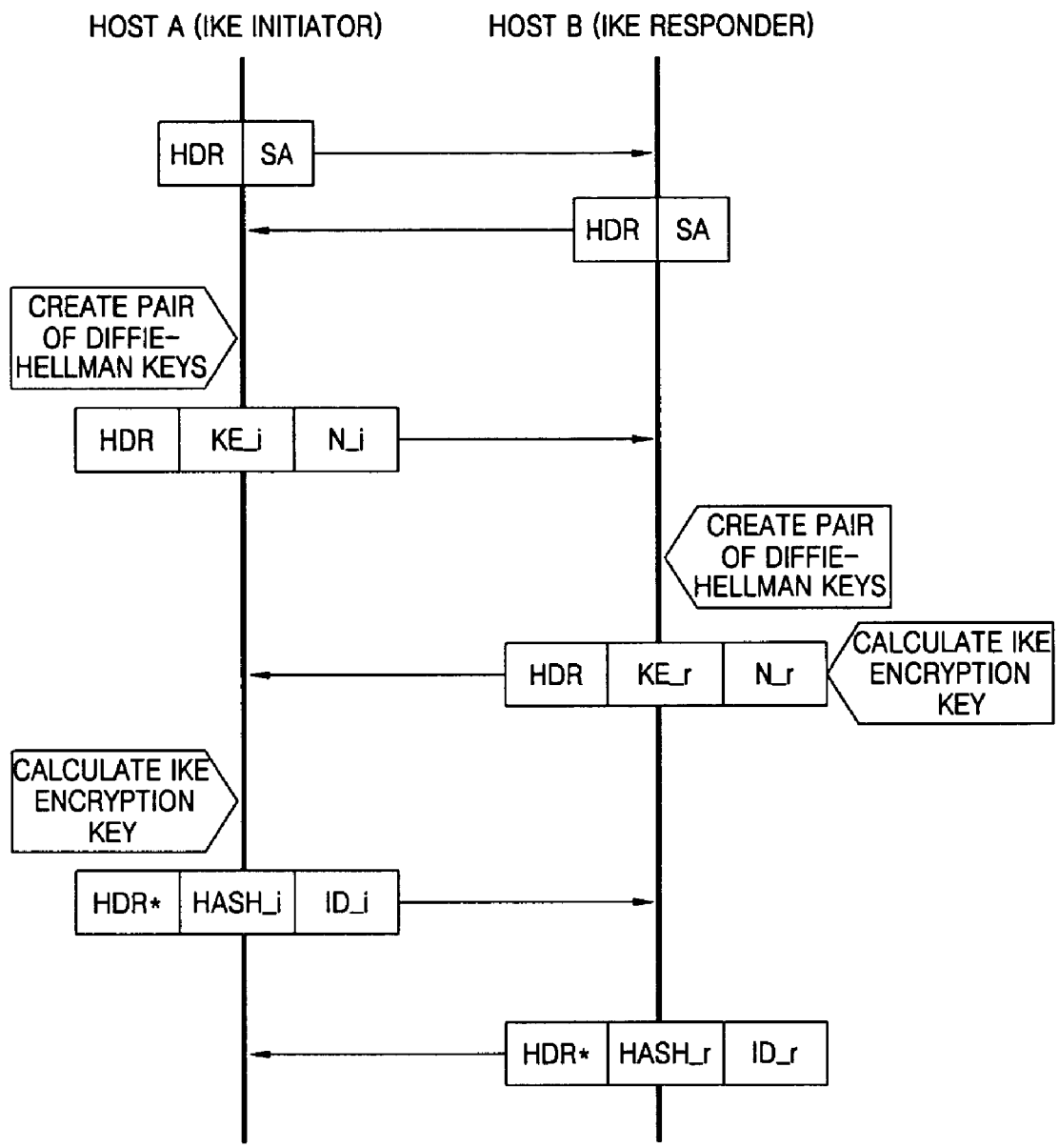
FIG. 2 is a flowchart of the first phase of the conventional method of generating an Internet Key Exchange (IKE) encryption key.
Figure 3:
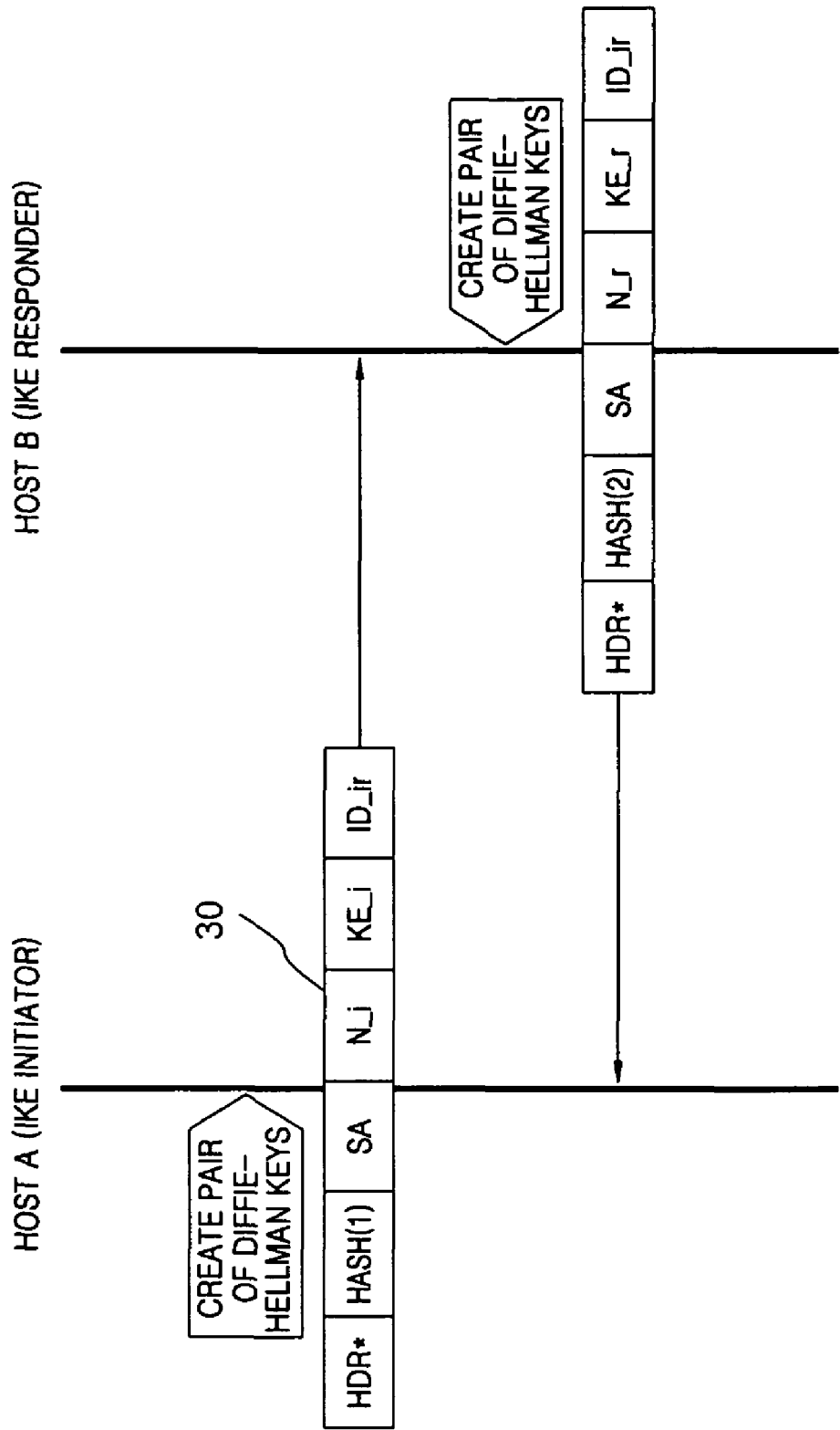
FIG. 3 is a flowchart of the second phase of the conventional method of generating an IKE encryption key.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 6:
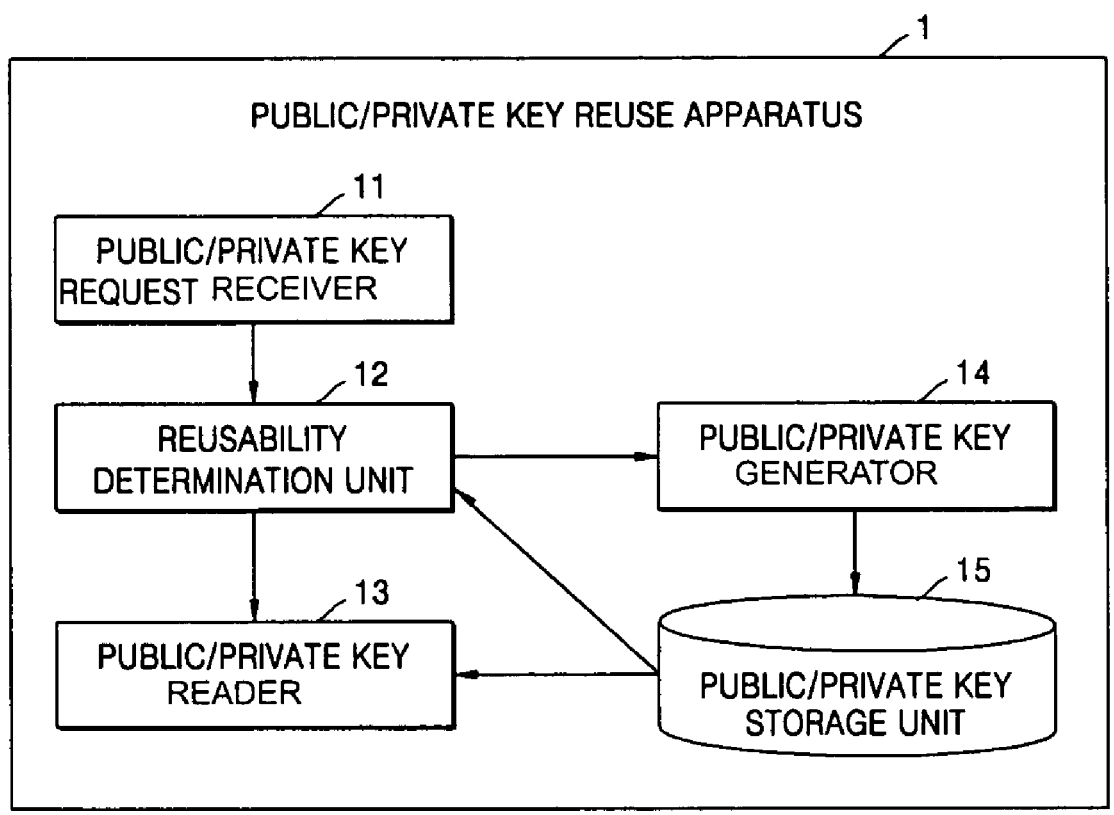
FIG. 6 is a block diagram of an apparatus that reuses a pair of public and private keys, according to an embodiment of the present invention.

FIG. 6 is a block diagram of an apparatus that reuses a pair of public and private keys, according to an embodiment of the present invention. Referring to FIG. 6, a public/private key reuse apparatus 1 includes a public/private key request receiver 11, a reusability determination unit 12, a public/private key reader 13, a public/private key generator 14, and a public/private key storage unit 15. The apparatus 1 more efficiently provides a pair of public and private keys in a Diffie-Hellman key agreement process. Here, the pair of public and private keys includes a public key transmitted from a predetermined host to another host and a private key of the predetermined host that is not transmitted to another host.

The public/private key request receiver 11 receives a request for the pair of public and private keys, which is supposed to be used in a predetermined encryption process. Here, the predetermined encryption process indicates a process of calculating a shared key according to the Diffie-Hellman key agreement protocol. When a request for a new pair of public and private keys is issued during the Diffie-Hellman key agreement process, the public/private key request receiver 11 receives the issued request.

The reusability determination unit 12 determines whether or not the pair of public and private keys that has already been used in an encryption process is reusable. Assuming that there are three hosts A, B, and C and the pair of public and private keys has already been used for connecting the hosts A and B, the pair of public and private keys can still be used for connecting the hosts A and C because the host C does not have any knowledge of the pair of public and private keys. Even though the pair of public and private keys is still usable for a connection between the hosts A and C after it has already been used for a connection between the hosts A and B, it is preferable to impose a restriction on the number of times the pair of public and private keys is allowed to be reused, since the more times the pair of public and private keys is reused, the more likely the pair of public and private keys is to be undesirably disclosed to another host.

If the reusability determination unit 12 determines that the pair of public and private keys are reusable, the public/private key reader 13 reads the pair of public and private keys, which will be used for calculating a shared key.

The public/private key generator 14 generates a pair of public and private keys. At an early stage of driving a host, a pair of public and private keys does not exist, and thus, a pair of public and private keys should be generated. Thereafter, whenever a request for a new pair of public and private keys is issued, a pair of public and private keys is generated.

The public/private key storage unit 15 stores the pair of public and private keys generated by the public/private key generator 14. Thus, the pair of public and private keys stored in the public/private key storage unit 15 has already been calculated. In addition, whenever it is needed, the pair of public and private keys is reused. In other words, the reusability determination unit 12 determines whether or not the pair of public and private keys stored in the public/private key storage unit 15 is reusable, and the public/private key reading unit 13 reads the pair of public and private keys from the public/private key storage unit 15.

If the reusability determination unit 12 determines that the pair of public and private keys stored in the public/private key storage unit 15 cannot be reused, the public/private key generator 14 generates a new pair of public and private keys, and the public/private key storage unit 15 stores the new pair of public and private keys generated by the public/private key generator 14. The new pair of public and private keys can be used for calculating a current shared key or can be stored for later use.

Figures 7, 8:
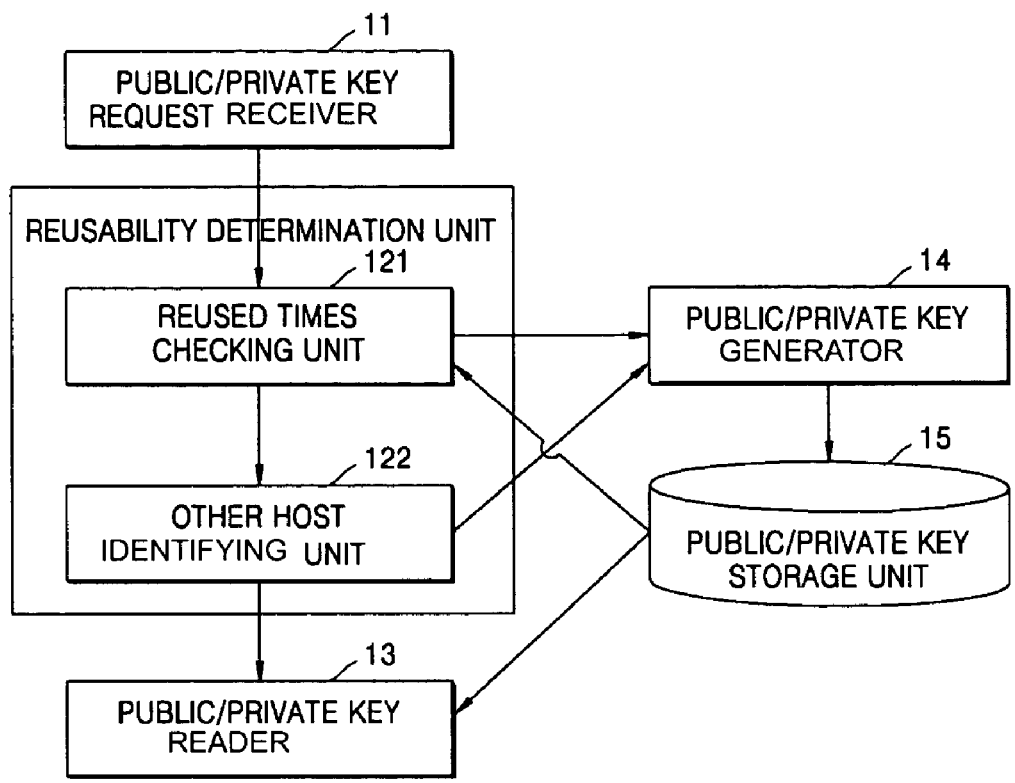
FIG. 7 is a detailed block diagram of the reusability determination unit 12 of FIG. 6.
FIG. 8 is a diagram illustrating an example of a method of storing pairs of public and private keys in the public/private key storage unit 15 of FIG. 6.

FIG. 7 is a detailed block diagram of the reusability determination unit 12 of FIG. 6. Referring to FIG. 7, the reusability determination unit 12 includes a reused times checking unit 121 and other host identifying unit 122.

When a request for a pair of public and private keys is received to the public/private key request receiver 11, the reused times checking unit 121 checks whether the number of times the pair of public and private keys stored in the public/private key storage unit 15 has been reused exceeds a predetermined maximum. The predetermined maximum may be set by a user or may be set at a default value by a system.

If the number of times the pair of public and private keys stored in the public/private key storage unit 15 has been reused does not exceed the predetermined maximum, the other host identifying unit 122 checks whether the pair of public and private keys has already been used by the other host. If the pair of public and private keys has already been used by the other host, the other host must be identified because the pair of public and private keys to be reused by the other host should be new to the predetermined host. In other words, once a pair of public and private keys is used to connect two hosts, the pair of public and private keys can only be used for connecting hosts other than the two hosts or connecting one of the two hosts to another host. If the pair of public and private keys, which has been used a number of times less than the predetermined maximum, has not yet been used to connect the two hosts, the public/private key reader 13 reads the pair of public and private keys.

If the number of times the pair of public and private keys stored in the public/private key storage unit 15 has been used exceeds the predetermined maximum (i.e., if the pair of public and private keys cannot be used any longer) or if the pair of public and private keys has already been used by the other host, the public/private key generator 14 generates a new pair of public and private keys. As described above, the new pair of public and private keys can be used to compute a current shared key or can be stored to compute a next shared key.

In the present embodiment, it is determined whether a predetermined pair of public and private keys is reusable by sequentially checking how many times and for which host the predetermined pair of public and private keys has been used. The reason for first checking the number of times the predetermined pair of public and private keys has been used to determine the reusability of the predetermined pair of public and private keys, is that data regarding the number of times the predetermined pair of public and private keys has been used is much smaller than an ID of a host for which the predetermined pair of public and private keys has been used. Therefore, the reusability of the predetermined pair of public and private keys can be more efficiently determined by filtering out pairs of public and private keys that cannot be reused first, using a smaller amount of data such as the data regarding the number of times each of the pairs of public and private keys has been used. However, a determination of reusability may also be made in reverse order.

FIG. 8 illustrates an example of a method of storing pairs of public and private keys in the public/private key storage unit 15 of FIG. 6. The public/private key storage unit 15 stores pairs of public and private keys in a table to more efficiently determine reusability of each of the pairs of public and private keys. Referring to FIG. 8, five pairs of public and private keys are stored in a table, and five storage cells in which identifications (IDs) of five hosts can be stored are allotted to each of the five pairs of public and private keys such that each of the pairs of public and private keys can be used up to five times. Hosts for which each of the pairs of public and private keys has been used are identified by their respective IP addresses. The table shows that the first pair of public and private keys has been used two times for a host with an IP address IP1 and a host with an IP address IP2, the second pair of public and private keys has been used three times for a host with an IP address IP3, a host with an IP address IP4, and the host with the IP address IP1, and the fifth pair of public and private keys has been used once for a host with an IP address IP5.

In order to determine whether a pair of public and private keys is reusable, it is checked first whether five storage cells allotted to the pair of public and private keys are all occupied by IDs of hosts, and then it is checked whether the ID of a host stored in each of the five storage cells is the same as the other host by which the pair of public and private keys is to be used.

Figure 9:
FIG. 9 is a diagram illustrating another example of the method of storing pairs of public and private keys in the public/private key storage unit 15 of FIG. 6.

FIG. 9 illustrates another example of the method of storing pairs of public and private keys in the public/private key storage unit 15 of FIG. 6. Referring to FIG. 9, five storage cells allotted to a first, second, or fifth pair of public and private keys are already taken by IP addresses of hosts for which the first, second, or fifth pair of public and private keys has been used. Therefore, the first, second, and fifth pairs of public and private keys cannot be reused any more. In order to more efficiently use the storage capacity of the public/private key storage unit 15, any of the first, second, and fifth pairs of public and private keys is deleted, and then a new pair of public and private keys is stored in the place that used to be occupied by the deleted pair of public and private keys. In FIG. 9, for example, the second pair of public and private keys is deleted, and then a sixth pair of public and private keys is stored in the place where the second pair of public and private keys was stored.

Figure 10:
FIG. 10 is a diagram illustrating another example of the method of storing pairs of public and private keys in the public/private key storage unit 15 of FIG. 6.

FIG. 10 illustrates another example of a method of storing pairs of public and private keys in the public/private key storage unit 15 of FIG. 6. Referring to FIG. 10, a first pair of public and private keys has been used five times, a second pair of public and private keys has been used three times, and a fifth pair of public and private keys has been used twice. Therefore, if a new pair of public and private keys is generated, the first pair of public and private keys, which cannot be reused any more, is deleted, and the new pair, pair 6, of public and private keys is stored in the place where the first pair of public and private keys was stored.

Figure 11:
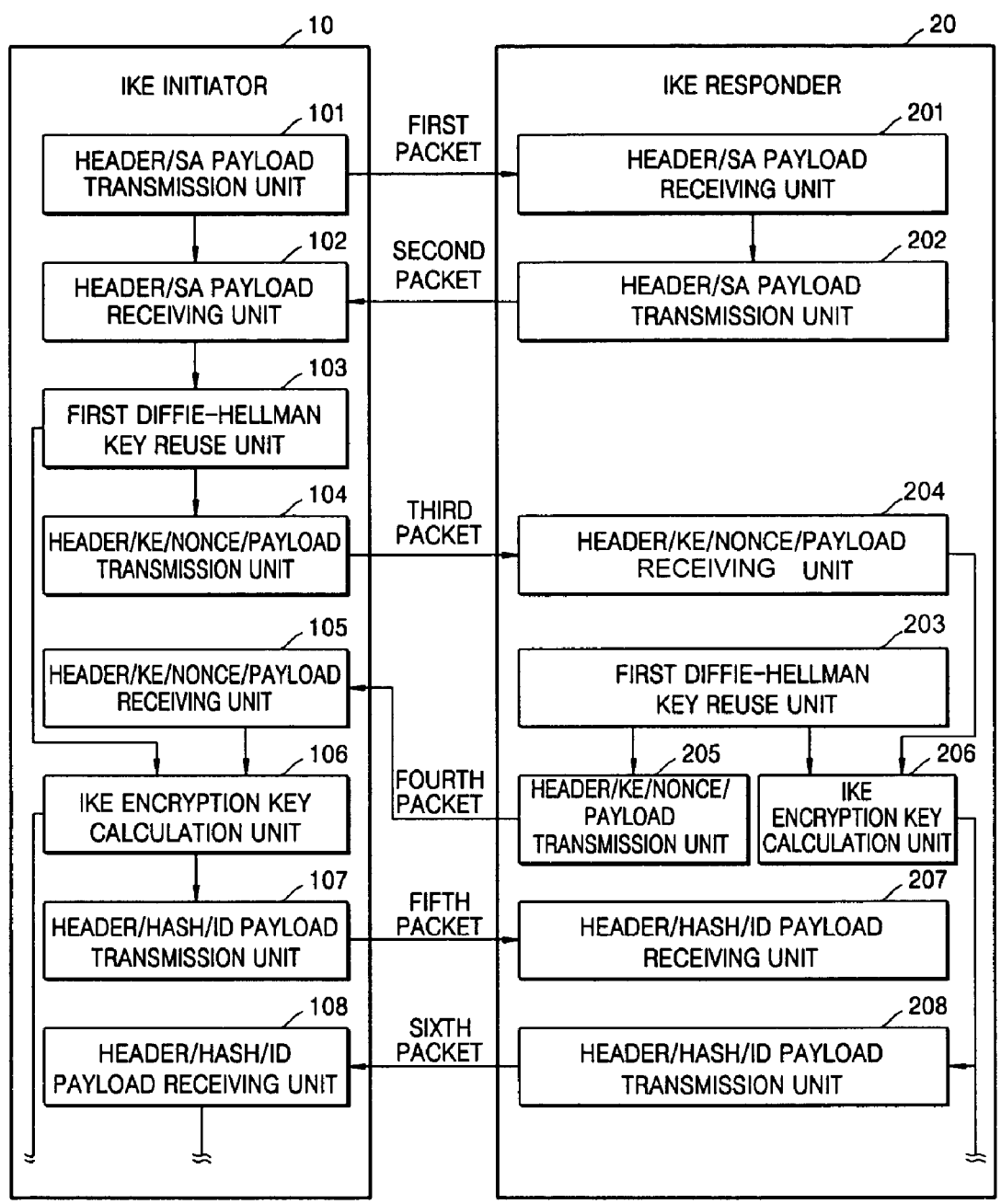
FIG. 11 is a block diagram illustrating an IKE initiator and an IKE responder that carry out a first phase of IKE, according to an embodiment of the present invention.

FIG. 11 is a block diagram illustrating an Internet Key Exchange (IKE) initiator 10 and an IKE responder that carry out a first phase of IKE, according to an embodiment of the present invention, in which the IKE initiator 10 initiates IKE and the IKE responder 20 responds to the IKE initiation. Referring to FIG. 11, the IKE initiator 10 includes a header/security association (SA) payload transmission unit 101, a header/SA payload receiving unit 102, a first Diffie-Hellman key reuse unit 103, a header/key exchange (KE)/nonce payload transmission unit 104, a header/KE/nonce payload receiving unit 105, an IKE encryption key calculation unit 106, a header/hash/ID payload transmission unit 107, and a header/hash/ID payload receiving unit 108. The IKE responder 20 includes a header/SA payload receiving unit 201, a header/SA payload transmission unit 202, a header/KE/nonce payload receiving unit 204, a first Diffie-Hellman key reuse unit 203, a header/KE/nonce payload transmission unit 205, an IKE encryption key calculation unit 206, a header/hash/ID payload receiving unit 207, and a header/hash/ID payload transmission unit 208. In a first phase of the IKE, an IKE encryption key is generated. In a second phase of the IKE, an IPsec encryption key, which is used to encrypt data, is generated.

The header/SA payload transmission unit 101 of the IKE initiator 10 transmits a first packet including a header and an SA payload to the, the IKE responder 20 (i.e., the other host). Here, the first packet has a predetermined format defined by the Internet Security Association & Key management Protocol (ISAKMP). The SA payload included in the first packet includes at least one proposal payload for setting SA.

The header/SA payload receiving unit 201 of the IKE responder 20 receives the first packet from the IKE initiator 10. Then, the header/SA payload transmission unit 202 of the IKE responder 20 transmits a second packet including a header and an SA payload to the IKE initiator 10. The SA payload included in the second packet includes a proposal payload selected from the at least one proposal payload included in the SA payload of the first packet.

The header/SA payload receiving unit 102 of the IKE initiator 10 receives the second packet from the IKE responder 20. Then, the header/SA payload receiving unit 102 of the IKE initiator 10 issues a request (not shown) for a pair of Diffie-Hellman keys to the IKE responder 20. The first Diffie-Hellman key reuse unit 103 of the IKE initiator 10 determines whether a first pair of Diffie-Hellman keys that has already been used to calculate a shared key is reusable and reads the first pair of Diffie-Hellman keys if the first pair of Diffie-Hellman keys is determined to be reusable.

The header/KE/nonce payload transmission unit 104 of the IKE initiator 10 transmits a third packet including a header, a KE payload, in which a Diffie-Hellman public key selected from the first pair of Diffie-Hellman keys is recorded, and a nonce payload to the IKE responder 20. The Diffie-Hellman public key, which is used to calculate a shared key, is recorded in the KE payload, and nonce data, which is used to prevent replay attacks, is recorded in the nonce payload.

Figure 4:
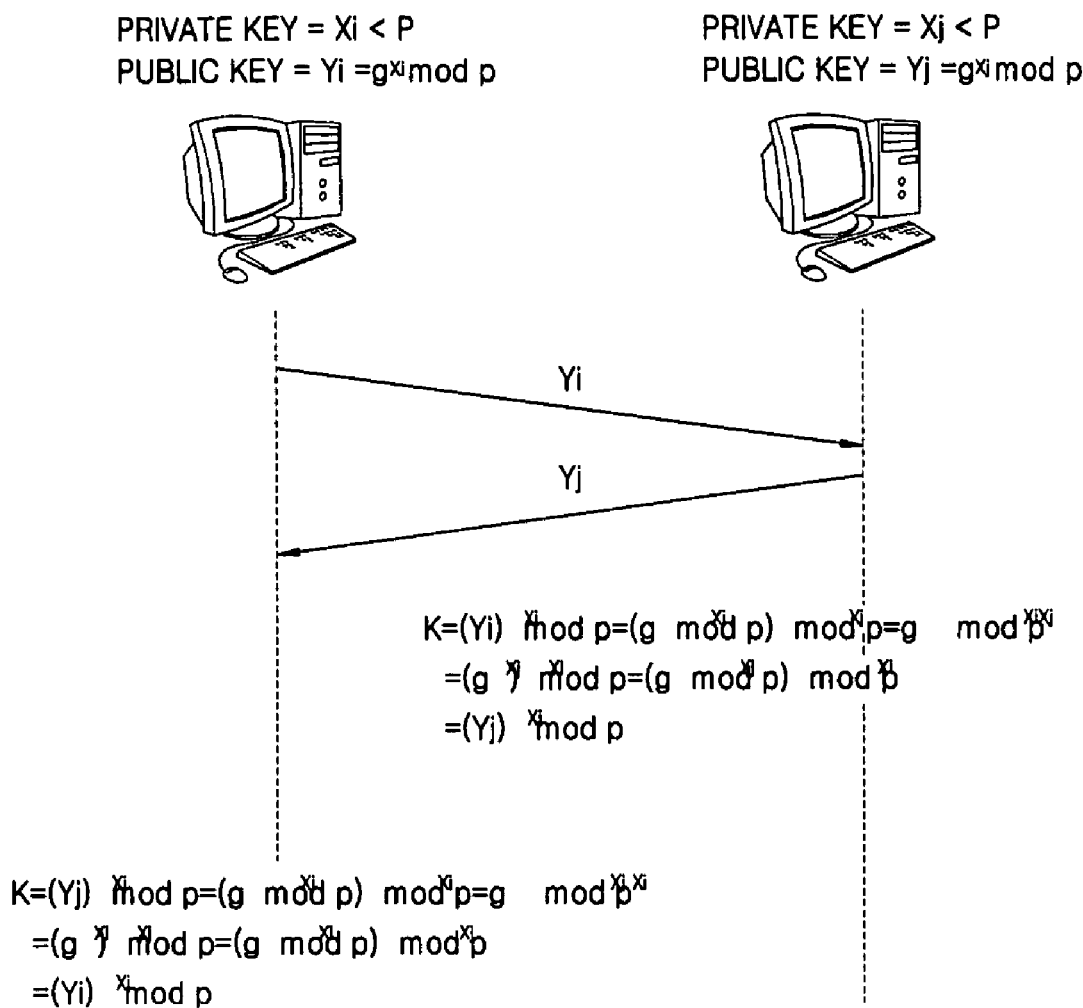
FIG. 4 is a diagram illustrating a conventional method of generating an encryption key according to the Diffie-Hellman key agreement protocol.
Figure 5:
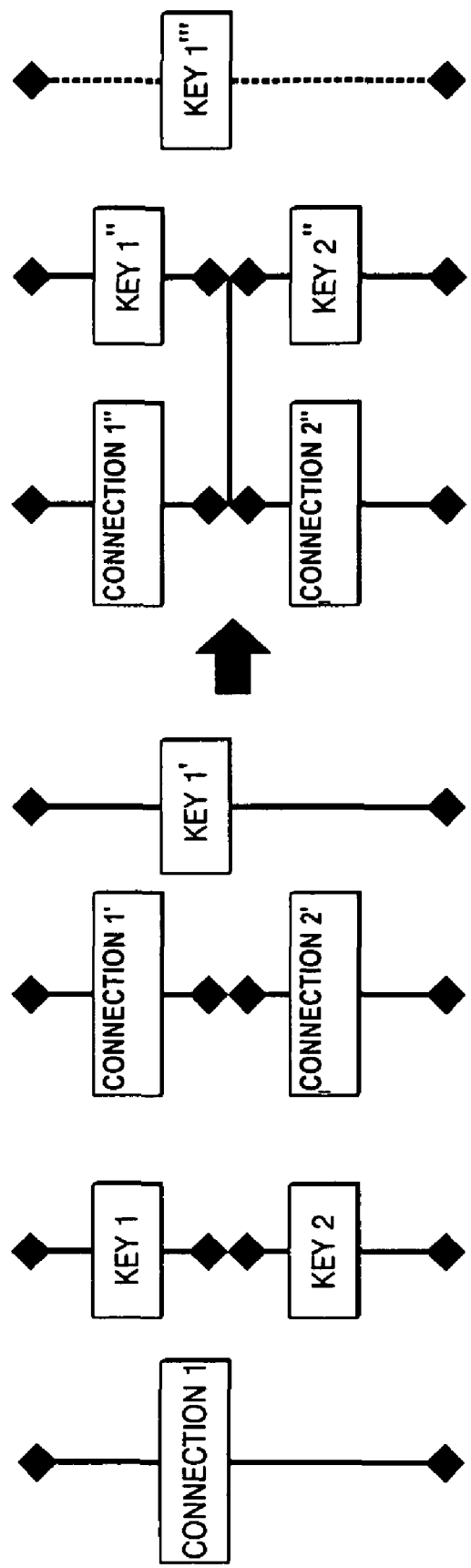
FIG. 5 is a diagram illustrating problems of the conventional IKE.

The header/KE/nonce payload receiving unit 204 of the IKE responder 20 receives the third packet from the IKE initiator 10. Then, the first Diffie-Hellman key reuse unit 203 of the IKE responder 20 determines whether a third pair of Diffie-Hellman keys, which has already been used to calculate a shared key, is reusable and reads the third pair of Diffie-Hellman keys if the third pair of Diffie-Hellman keys is determined to be reusable. The header/KE/nonce payload transmission unit 205 of the IKE responder 20 transmits a fourth packet including a header, a KE payload, in which a Diffie-Hellman public key selected from the third pair of Diffie-Hellman keys is recorded, and a nonce payload to the IKE initiator 10. The IKE encryption key calculation unit 206 of the IKE responder 20 calculates a shared key using the Diffie-Hellman public key recorded in the KE payload of the third packet received from the header/KE/nonce payload receiving unit 204 and a Diffie-Hellman private key selected from the third pair of Diffie-Hellman keys read by the Diffie-Hellman key reuse unit 203 and then calculates an IKE encryption key using the calculated shared key. Diffie-Hellman equations for calculating the shared key are illustrated in FIG. 4. An equation for calculating the IKE encryption key is well known in the art, and thus its description will not be presented here.

The header/KE/nonce payload receiving unit 105 of the IKE initiator 10 receives the fourth packet from the IKE responder 20. The IKE encryption key calculation unit 106 of the IKE initiator 10 calculates a shared key using the Diffie-Hellman public key recorded in the KE payload of the fourth packet received from the header/KE/nonce payload receiving unit 105 and a Diffie-Hellman private key selected from the first pair of Diffie-Hellman keys read by the Diffie-Hellman key reuse unit 103 and then calculates an IKE encryption key using the calculated shared key. The header/hash/ID payload transmission unit 107 of the IKE initiator 10 transmits a fifth packet including a header, and hash and ID payloads, which are encrypted using the IKE encryption key calculated by the IKE encryption key calculation unit 106, to the IKE responder 20. The hash payload records a predetermined value that both the IKE initiator 10 and the IKE responder 20 agree upon so as to guarantee integrity of messages transmitted therebetween. If a value recorded in the hash payload of the fifth packet does not match with the predetermined value, the fifth packet is abandoned. The ID payload records ID information that identifies the IKE responder 20.

The header/hash/ID payload receiving unit 207 of the IKE responder 20 receives the fifth packet from the IKE initiator 10. Then, the header/hash/ID payload transmission unit 208 of the IKE responder 20 transmits a sixth packet including a header, and hash and ID payloads, which are encrypted using the IKE encryption key calculated by the IKE encryption key calculation unit 206, to the IKE initiator 10.

The header/hash/ID payload receiving unit 108 of the IKE initiator 10 receives the sixth packet from the IKE responder 20.

Figure 12:
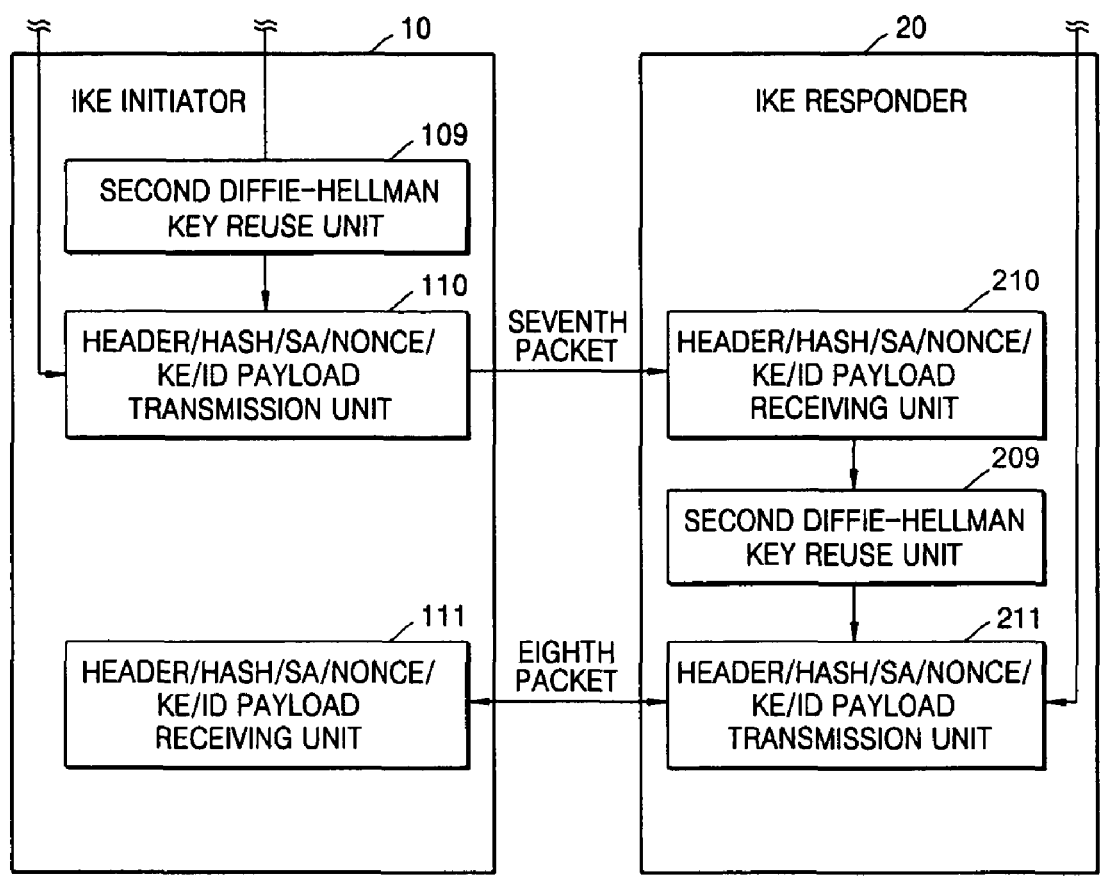
FIG. 12 is a block diagram illustrating an IKE initiator and an IKE responder that carry out a second phase of IKE, according to another embodiment of the present invention.

FIG. 12 is a block diagram illustrating an IKE initiator 10 and an IKE responder 20 that carry out a second phase of the IKE, according to another embodiment of the present invention. The IKE initiator 10 of FIG. 12 is the same as the IKE initiator 10 of FIG. 11 except that it further includes a second Diffie-Hellman key reuse unit 109, a header/hash/SA/nonce/KE/ID payload transmission unit 110, and a header/hash/SA/nonce/KE/ID payload receiving unit 111 to perform a second phase of the IKE. The IKE responder 20 of FIG. 12 is the same as the IKE responder 20 of FIG. 11 except that it further includes a header/hash/SA/nonce/KE/ID payload receiving unit 210, a second Diffie-Hellman key reuse unit 209, and a header/hash/SA/nonce/KE/ID payload transmission unit 211. An IPsec encryption key, which is used to encrypt data, is generated in the second phase of the IKE.

Referring to FIG. 12, if the header/hash/ID payload receiving unit 108 of the IKE initiator 10 receives the sixth packet from the IKE responder 20 in the first phase of the IKE, the second Diffie-Hellman key reuse unit 109 of the IKE initiator 10 determines whether a second pair of Diffie-Hellman keys is reusable and reads the second pair of Diffie-Hellman keys if the second pair of Diffie-Hellman keys is determined to be reusable. While the first pair of Diffie-Hellman keys read by the first Diffie-Hellman key reuse unit 103 is used to calculate the IKE encryption key, the second pair of Diffie-Hellman keys read by the second Diffie-Hellman key reuse unit 109 is used to calculate an IPsec encryption key. The header/hash/SA/nonce/KE/ID payload transmission unit 110 of the IKE initiator 10 transmits a seventh packet including a header, a KE payload, which is encrypted using the IKE encryption key calculated by the IKE encryption key calculation unit 106 and in which a Diffie-Hellman public key selected from the second pair of Diffie-Hellman keys read by the second Diffie-Hellman key reuse unit 109 is recorded, and a hash payload, an SA payload, a nonce payload, and an ID payload, which are encrypted using the IKE encryption key calculated by the IKE encryption key calculation unit 106, to the IKE responder 20.

The header/hash/SA/nonce/KE/ID payload receiving unit 210 of the IKE responder 20 receives the seventh packet from the IKE initiator 10. Then, the second Diffie-Hellman key reuse unit 209 of the IKE responder 20 determines whether a fourth pair of Diffie-Hellman keys, which has already been used to calculate a shared key, is reusable and then reads the fourth pair of Diffie-Hellman keys if the fourth pair of Diffie-Hellman keys is determined to be reusable. The header/hash/SA/nonce/KE/ID payload transmission unit 211 of the IKE responder 20 transmits an eighth packet including a header, a KE payload, which is encrypted using the IKE encryption key calculated by the IKE encryption key calculation unit 206 and in which a Diffie-Hellman public key selected from the fourth pair of Diffie-Hellman keys is recorded, and a hash payload, an SA payload, a nonce payload, and an ID payload, which are encrypted using the IKE encryption key calculated by the IKE encryption key calculation unit 206, to the IKE initiator 10.

The header/hash/SA/nonce/KE/ID payload receiving unit 111 of the IKE initiator 10 receives the eighth packet from the IKE responder 20. The eighth packet KE payload includes the IPsec encryption key.

Figure 13:
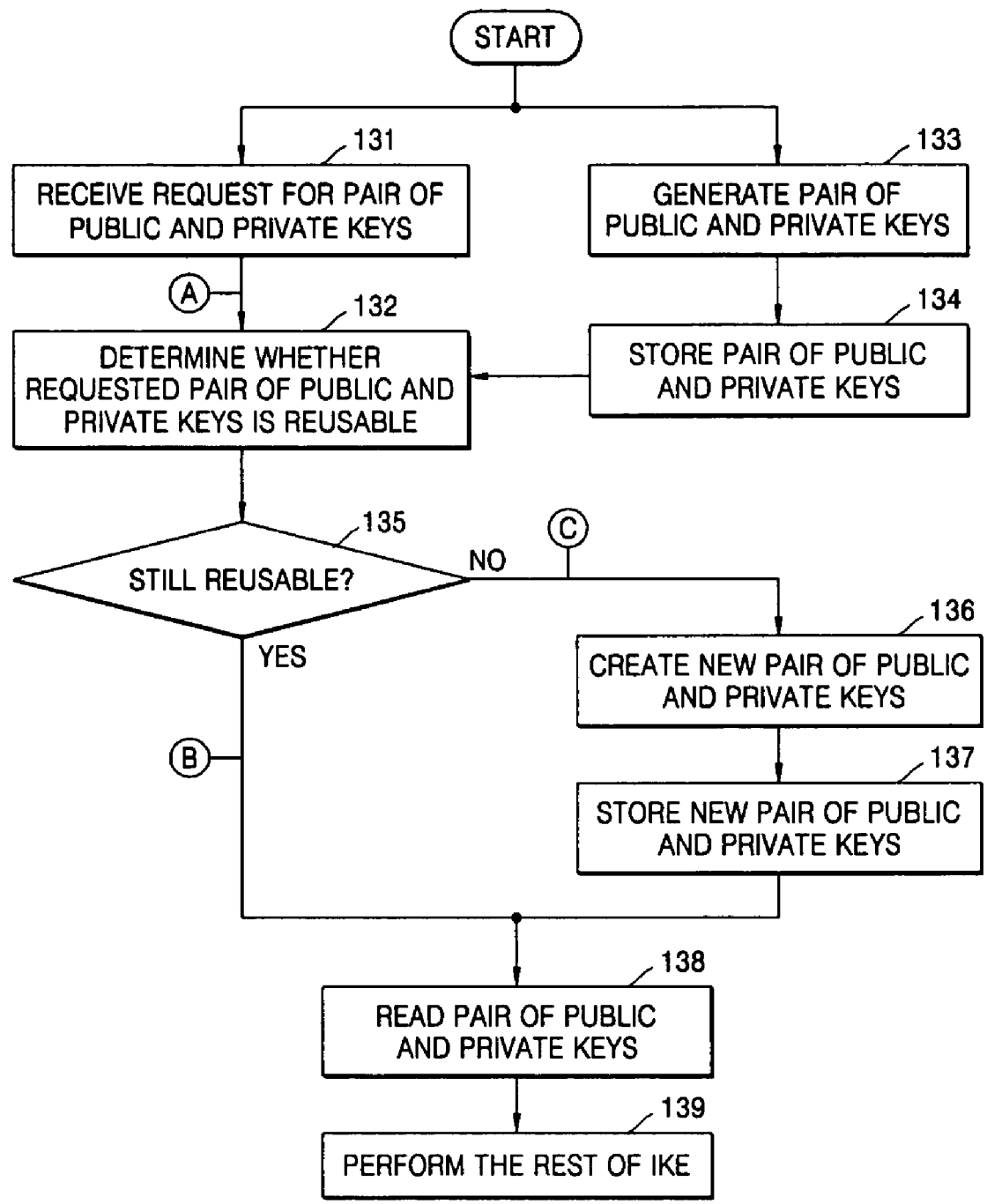
FIG. 13 is a flowchart of a method of reusing a pair of public and private keys according to an embodiment of the present invention.

FIG. 13 is a flowchart of a method of reusing a pair of public and private keys according to an embodiment of the present invention. The pair of public and private keys includes a public key, which is transmitted between hosts, and a private key, which is not transmitted between the hosts. In the present embodiment, a Diffie-Hellman's shared key calculation method is used.

Referring to FIG. 13, a request for a pair of public and private keys, which will be used for a predetermined encryption process, is received in operation 131. In operation 132, it is determined whether the pair of public and private keys is reusable. If the pair of public and private keys is determined to be reusable in operation 135, the pair of public and private keys is read in operation 138. Thereafter, the remaining portion of the IKE is performed in operation 139.

Before operation 132, a pair of public and private keys may be generated in operation 133 and then stored in operation 134. In this case, it is determined in operation 132 whether the pair of public and private keys stored in operation 134 is reusable, and the pair of public and private keys stored in operation 134 is read in operation 138 if it is determined to be reusable.

If the pair of public and private keys stored in operation 134 is determined not to be reusable, a pair of public and private keys is newly generated in operation 136 and then stored in operation 137. Thereafter, the pair of public and private keys stored in operation 137 is read in operation 138. Thereafter, the rest of IKE is performed in operation 139.

Figure 14:
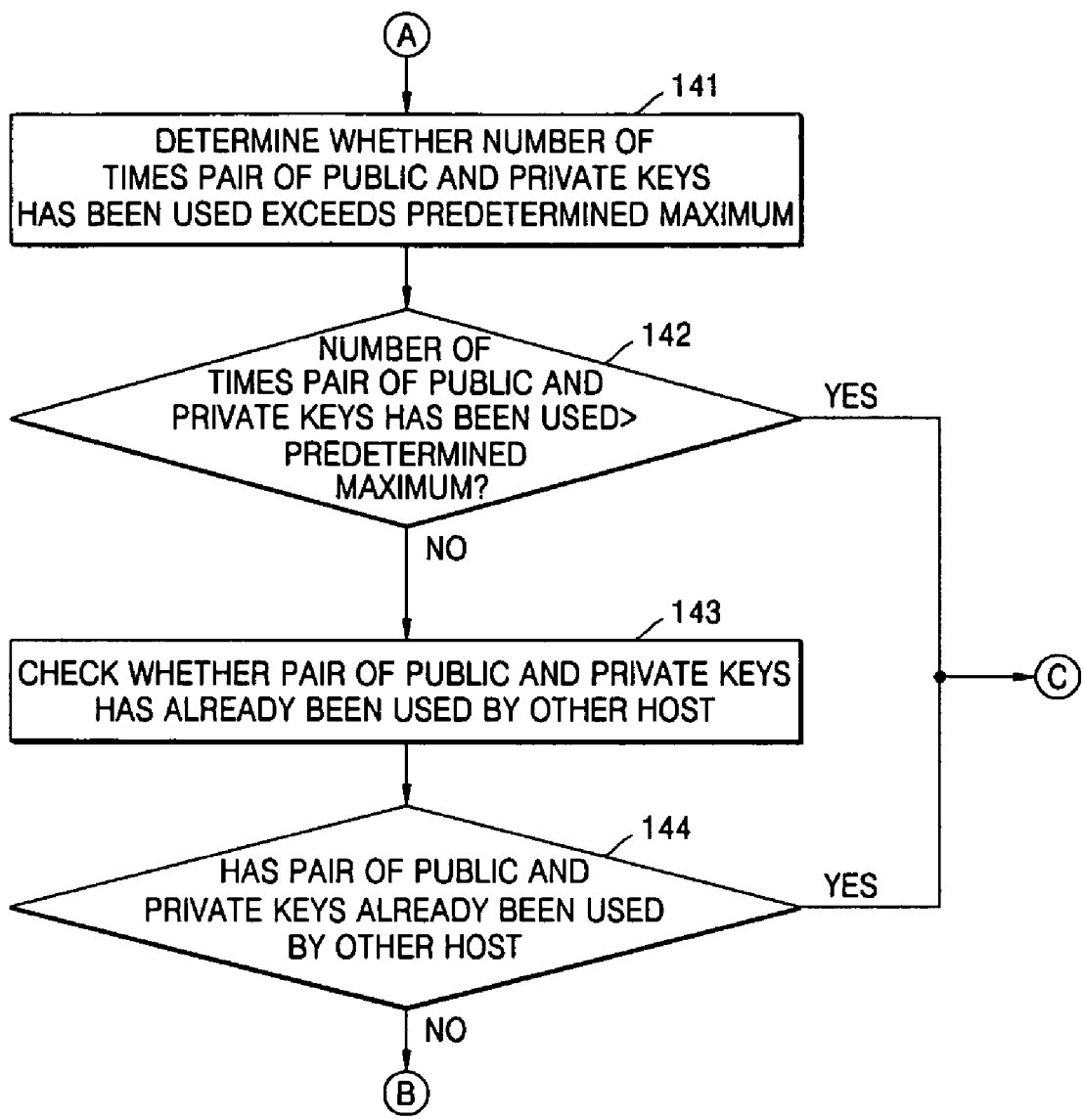
FIG. 14 is a detailed flowchart of operation 132 of FIG. 13.

FIG. 14 is a detailed flowchart of operations 132 and 135 of FIG. 13. The pair of public and private keys includes a public key, which is transmitted between hosts, and a private key, which is not transmitted between the hosts. In the present embodiment, a Diffie-Hellman's shared key calculation method is used.

Referring to FIG. 14, if a request for a pair of public and private keys is received in operation 131, it is checked whether the number of times the pair of public and private keys stored in operation 134 of FIG. 13 has been used exceeds a predetermined maximum in operation 141. If the number of times the pair of public and private keys stored in operation 134 has been used does not exceeds the predetermined maximum in operation 142, it is checked whether the pair of public and private keys stored in operation 134 has already been used for a predetermined host at which the pair of public and private keys stored in operation 134 is currently aimed in operation 143. If it is determined in operation 144 that the pair of public and private keys stored in operation 134 has not yet been used for the predetermined host, the pair of public and private keys stored in operation 134 is read in operation 138 of FIG. 13.

If it is determined in operation 142 that the pair of public and private keys stored in operation 134 has been used a number of times more than the predetermined maximum or if it is determined in operation 144 that the pair of public and private keys stored in operation 134 has already been used for the predetermined host, a new pair of public and private keys is generated in operation 136 of FIG. 13. In operation 137 of FIG. 13, the new pair of public and private keys is stored.

Figure 15:
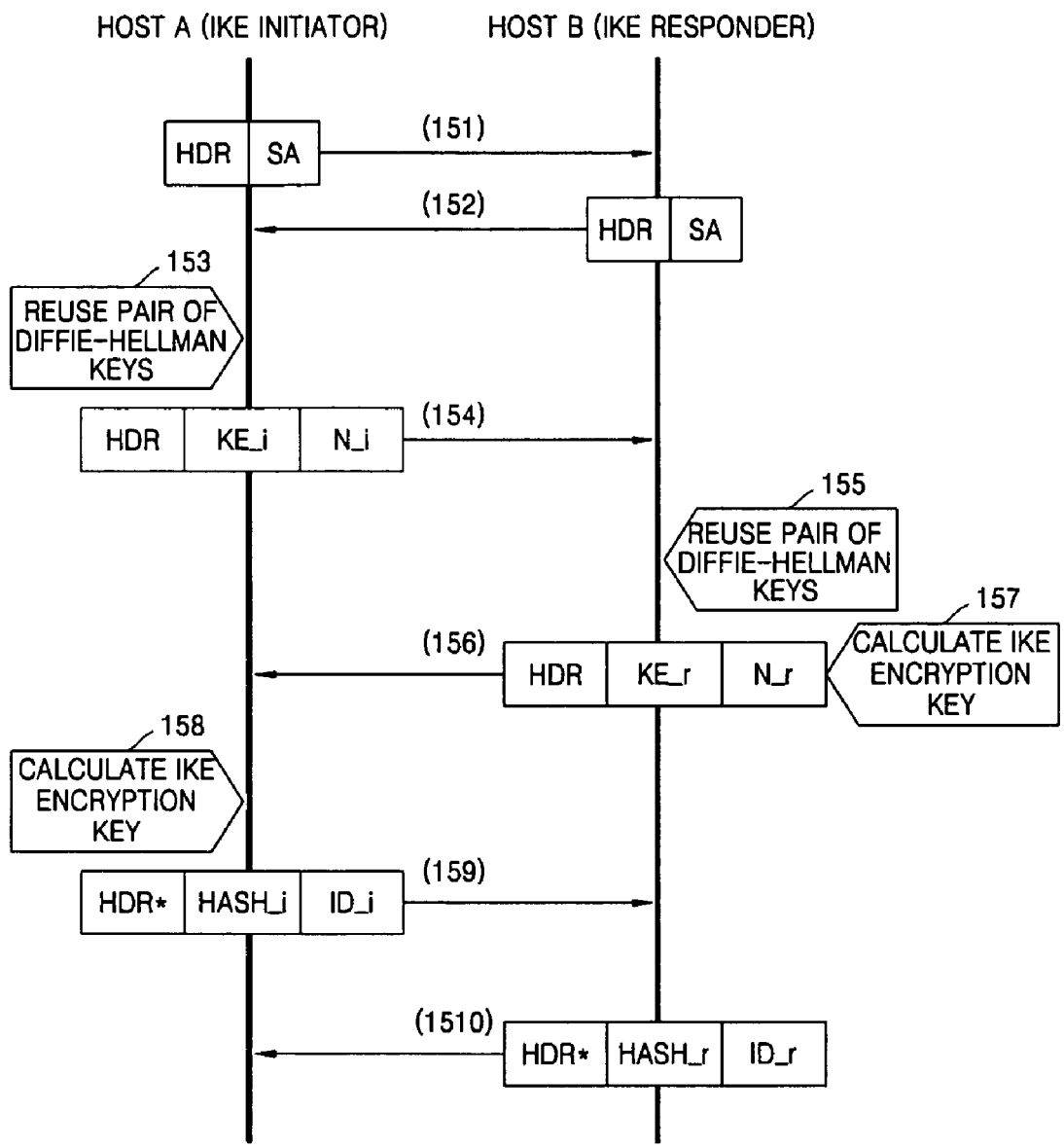
FIG. 15 is a flowchart of methods of initiating IKE and responding to an IKE initiation in a first phase of IKE, according to an embodiment of the present invention.

FIG. 15 is a flowchart of a first phase of IKE according to an embodiment of the present invention, in which a host initiates IKE, and another host responds to the IKE initiation. Referring to FIG. 15, a host A transmits a first packet including a header and an SA payload to a host B in operation 151. Then, the host B, which receives the first packet from the host A, transmits a second packet including a header and an SA payload to the host A in operation 152. If the host A receives the second packet from the host B, the host A issues a request for a pair of Diffie-Hellman keys to the host B in operation 153. Then, the host B, which receives the request for a pair of Diffie-Hellman keys, determines whether a first pair of Diffie-Hellman keys, which has been used to calculate a shared key, is reusable and reads the first pair of Diffie-Hellman keys in operation 153 if the first pair of Diffie-Hellman keys is determined to be reusable.

In operation 154, the host A transmits a third packet including a header, a KE payload, in which a public key selected from the first pair of Diffie-Hellman keys read in operation 153 is recorded, and a nonce payload to the host B. Then, the host B, which receives the third packet from the host A, determines whether a third pair of Diffie-Hellman keys, which has been used to calculate a shared key, is reusable and reads the third pair of Diffie-Hellman keys in operation 155 if the third pair of Diffie-Hellman keys is determined to be reusable.

In operation 156, the host B transmits a fourth packet including a header, a KE payload, in which a public key selected from the third pair of Diffie-Heilman keys read in operation 155 is recorded, and a nonce payload to the host A. In operation 157, the host B calculates a shared key using the public key recorded in the KE payload of the third packet and a private key selected from the third pair of Diffie-Hellman keys and calculates an IKE encryption key using the calculated shared key.

In operation 158, the host A, which receives the fourth packet from the host B in operation 156, calculates a shared key using the public key recorded in the KE payload of the fourth packet and a private key selected from the first pair of Diffie-Hellman keys and calculates an IKE encryption key using the calculated shared key. In operation 159, the host A transmits a fifth packet including a header, and a hash payload and an ID payload, which are encrypted using the IKE encryption key calculated in operation 158, to the host B.

In operation 1510, the host B, which receives the fifth packet from the host A in operation 159, transmits a sixth packet including a header, and hash and ID payloads, which are encrypted using the IKE encryption key calculated in operation 157, to the host A, and the host A receives the sixth packet from the host B.

Figure 16:
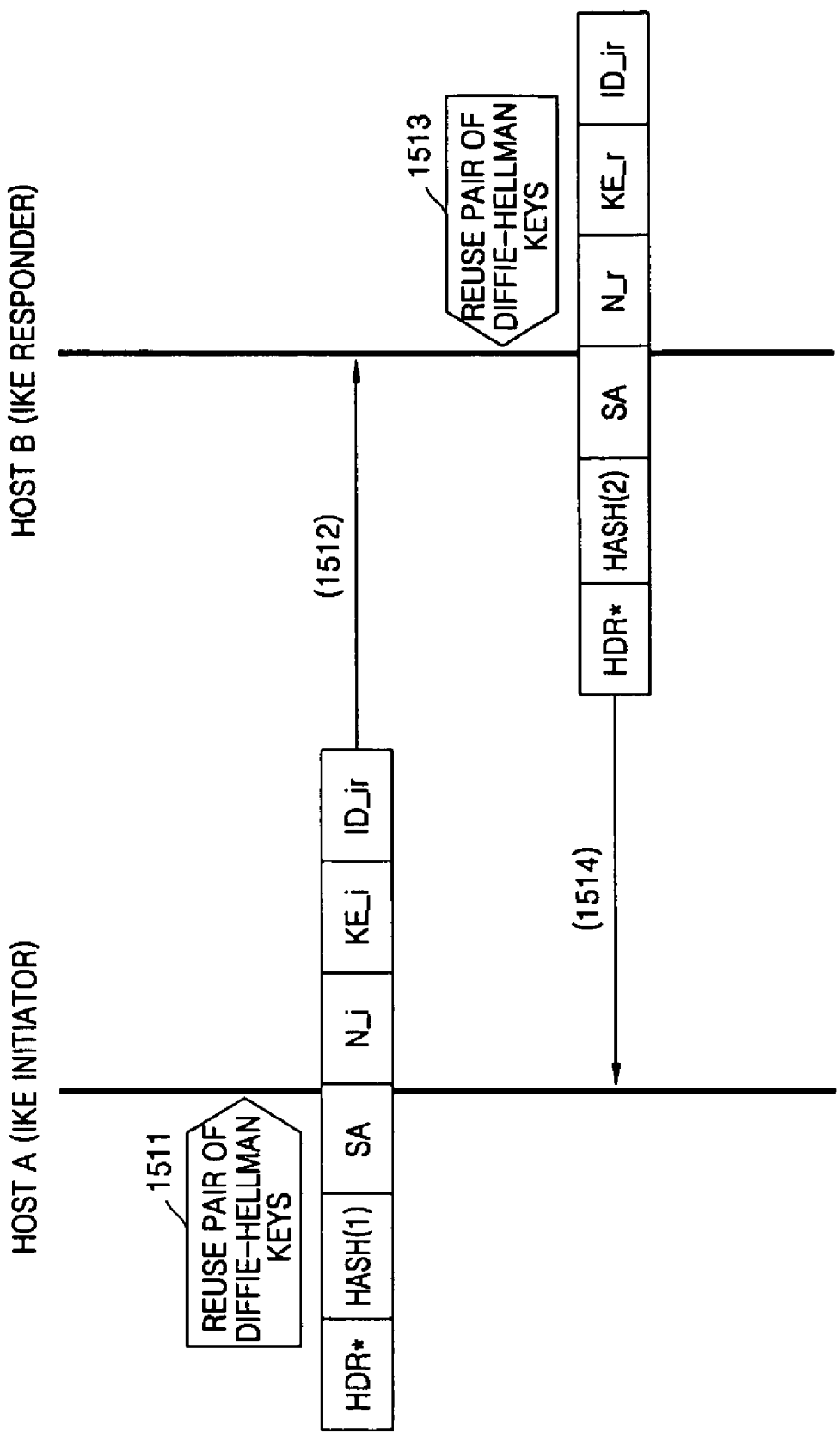
FIG. 16 is a flowchart of methods of initiating IKE and responding to an IKE initiation in a second phase of the IKE, according to another embodiment of the present invention.

FIG. 16 is a flowchart of a second phase of the IKE according to an embodiment of the present invention. Referring to FIG. 16, in operation 1511, the host A, which receives the sixth packet from the host B in operation 1510, determines whether a second pair of Diffie-Hellman keys is reusable and reads the second pair of Diffie-Hellman keys if the second pair of Diffie-Hellman keys is determined to be reusable. In operation 1512, the host A transmits a seventh packet including a header, a KE payload, which is encrypted using the IKE encryption key calculated in operation 158 and in which a public key selected from the second pair of Diffie-Hellman keys is recorded, and a hash payload, an SA payload, a nonce payload, and an ID payload, which are encrypted using the IKE encryption key calculated in operation 158, to the host B.

In operation 1513, the host B, which receives the seventh packet from the host A in operation 1512, determines whether a fourth pair of Diffie-Hellman keys, which has been used to calculate a shared key, is reusable and reads the fourth pair of Diffie-Hellman keys if the fourth pair of Diffie-Hellman keys is determined to be reusable. In operation 1514, the host B transmits an eighth packet including a header, a KE payload, which is encrypted using the IKE encryption key calculated in operation 157 and in which a public key selected from the fourth pair of Diffie-Hellman keys is recorded, and a hash payload, an SA payload, a nonce payload, and an ID payload, which are encrypted using the IKE encryption key calculated in operation 157, to the host A, and the host A receives the eighth packet from the host B.

The above-described embodiments of the present invention can be realized as a computer program and can be written on a computer-readable recording medium so that they can be executed in a common digital computer.

In addition, data structures used in the embodiments of the present invention can be recorded on a computer-readable recording medium in many ways. The computer-readable recording medium includes at least a magnetic storage medium, such as ROM, a floppy disk, or a hard disk, and an optical storage medium, such as CD-ROM or a DVD.

According to the embodiments of the present invention, it is possible to considerably reduce the amount computation required, and concomitantly, costs associated therewith, to generate a pair of public and private keys, which is used to calculate a shared key, by reusing the pair of public and private keys. In addition, it is possible to guarantee perfect forward secrecy (PFS) by preventing the pair of public and private keys from being reused by any hosts that have already used the pair of public and private keys.

In order to guarantee PFS, the cycle of renewing an encryption key should be short. However, the shorter the cycle of renewing an encryption key is, the larger the amount of computation required to calculate a shared key, in which case, a workload of each host increases. In embodiments of the present invention, it is possible to reduce the workload of each host by reusing a pair of public and private keys while preventing the pair of public and private keys from being reused by any hosts that have already used the pair of public and private keys.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of reusing a pair of public and private keys, which is performed in a host, the method comprising:
determining whether a pair of public and private keys that have already been used in a first encryption process between the host and a second host are still usable in a second encryption process, wherein the pair of public and private keys are determined as being reusable if the second encryption process is between the host and a third host other than the second host; and
reusing the pair of public and private keys in the second encryption process if the pair of public and private keys are determined as being reusable,
wherein the determining whether the pair of public and private keys are reusable comprises
determining whether a number of times the pair of public and private keys have been used exceeds a predetermined maximum number; and
determining whether the pair of public and private keys have already been used by the third host unless the number of times the pair of public and private keys have been used exceeds the predetermined maximum number,
wherein, the pair of public and private keys are reused in the second encryption process if the pair of public and private keys have not yet been used by the third host.

2. The method of claim 1, wherein the pair of public and private keys comprises a public key which is transmitted from the host to the third host and a private key which is not transmitted from the host to the third host.

3. The method of claim 1, wherein the first and second encryption processes are processes of calculating a shared key according to a Diffie-Hellman key agreement protocol.

4. The method of claim 1, further comprising:
generating anew pair of public and private keys if the pair of public and private keys are determined as not being reusable,
wherein, the new generated pair of public and private keys are used in the second encryption process.

5. A method of reusing a pair of public and private keys, which is performed in a host, the method comprising:
determining whether a pair of public and private keys that have already been used in a first encryption process between the host and a second host are still usable in a second encryption process, considering whether the second encryption process is between the host and the second host or between the host and a third host other than the second host; and
reusing the pair of public and private keys in the second encryption process if the pair of public and private keys are determined as being reusable,
wherein the determining whether the pair of public and private keys are reusable comprises:
determining whether a number of times the pair of public and private keys have been used exceeds a predetermined maximum number; and determining whether the pair of public and private keys have already been used by the third host unless the number of times the pair of public and private keys have been used exceeds the predetermined maximum number, wherein, the pair of public and private keys are reused in the second encryption process if the pair of public and private keys have not yet been used by the third host.

6. An Internet key exchange (IKE) initiation method, which is performed in a host, the IKE initiation method comprising:

receiving a first packet having a key exchange payload from a second host, a public key included in a pair of Diffie-Hellman keys being recorded in the key exchange payload;

determining whether the pair of Diffie-Hellman keys that have already been used in calculating a first shared key between the host and a second host are reusable in calculating a second shared key, wherein the pair of Diffie-Hellman keys are determined as being reusable if the second shared key is between the host and a third host other than the second host; and calculating an IKE encryption key based on the public key recorded in the key exchange payload of the first packet if the pair of Diffie-Hellman keys are determined as being reusable.

wherein the determining whether the pair of Diffie-Hellman keys are reusable comprises determining whether a number of times the pair of Diffie-Hellman keys have been used exceeds a predetermined maximum number; and determining whether the pair of Diffie-Hellman keys have already been used by the third host unless the number of times the pair of Diffie-Hellman keys have been used exceeds the predetermined maximum number, wherein, the pair of Diffie-Hellman keys are reused if the pair of Diffie-Hellman keys have not yet been used by the third host.

7. The IKE initiation method of claim 6, wherein the calculating the IKE encryption key comprises, calculating the IKE encryption key according to the second shared key calculated according to the public key recorded in the key exchange payload of the first packet and a private key included in the pair of Diffie-Hellman keys.

8. The IKE initiation method of claim 6, further comprising:

reading the pair of Diffie-Hellman keys if the pair of Diffie-Hellman keys are determined as being reusable; and transmitting a second packet having a second key exchange payload to the third host, the public key included in the pair of Diffie-Hellman keys being recorded in the second key exchange payload, wherein, the first packet is received from the third host which has received the second packet.

9. The IKE initiation method of claim 6, further comprising:

transmitting a second packet including a hash payload and an ID payload to the third host, the hash payload and the ID payload being encrypted according to the IKE encryption key.

10. An Internet key exchange (IKE) response method, which is performed in a host, comprising:

determining whether a pair of Diffie-Hellman keys that have already been used in calculating a first shared key between the host and a second host are reusable in calculating a second shared key, wherein the pair of Diffie-Hellman keys are determined as being reusable if the second shared key is between the host and a third host other than the second host;

reading the pair of Diffie-Hellman keys if the pair of Diffie-Hellman keys are determined as being reusable; and calculating an IKE encryption key based on the read pair of Diffie-Hellman keys between the host and the third host, wherein the determining whether the pair of Diffie-Hellman keys are reusable comprises determining whether a number of times the pair of Diffie-Hellman keys have been used exceeds a predetermined maximum number; and determining whether the pair of Diffie-Hellman keys have already been used by the third host unless the number of times the pair of Diffie-Hellman keys have been used exceeds the predetermined maximum number, wherein, the pair of Diffie-Hellman keys are reused if the pair of Diffie-Hellman keys have not yet been used by the third host.

11. The IKE response method of claim 10, further comprising:

receiving a first packet having a key exchange payload from the third host, a public key included in the pair of Diffie-Hellman keys being recorded in the key exchange payload, wherein the determining whether the pair of Diffie-Hellman keys are reusable occurs after the receiving the first packet.

12. The IKE response method of claim 11, wherein the calculating the IKE encryption key comprises calculating the second shared key according to the public key recorded in the key exchange payload of the first packet and a private key included in the pair of Diffie-Hellman keys, and calculating the IKE encryption key according to the second shared key.

13. The IKE response method of claim 10 further comprising:

transmitting a second packet having a key exchange payload to the third host, the public key included in the pair of Diffie-Hellman keys being recorded in the key exchange payload.

14. The IKE response method of claim 13, further comprising:

receiving a third packet including a hash payload and an ID payload from the third host that has received the second packet, the hash payload and the ID payload being encrypted according to the IKE encryption key.

15. A non-transitory computer-readable recording medium, on which a program enabling a method of reusing a pair of public and private keys is recorded, the method comprising:

determining whether a pair of public and private keys that have already been used in a first encryption process between the host and a second host are still usable in a second encryption process, wherein the pair of public and private keys are determined as being reusable if the second encryption process is between the host and a third host other than the second host; and reusing the pair of public and private keys in the second encryption process if the pair of public and private keys are determined as being reusable, wherein the determining whether the pair of public and private keys are reusable comprises determining whether a number of times the pair of public and private keys have been used exceeds a predetermined maximum number; and determining whether the pair of public and private keys have already been used by the third host unless the number of times the pair of public and private keys have been used exceeds the predetermined maximum number, wherein, the pair of public and private keys are reused in the second encryption process if the pair of public and private keys have not yet been used by the third host.

16. A non-transitory computer-readable recording medium, on which a program enabling an Internet key exchange (IKE) initiation method is recorded, the IKE initiation method comprising:

receiving a first packet having a key exchange payload from a second host, a public key included in a pair of Diffie-Hellman keys being recorded in the key exchange payload;

determining whether the pair of Diffie-Hellman keys that have already been used in calculating a first shared key between the host and a second host are reusable in calculating a second shared key, wherein the pair of Diffie-Hellman keys are determined as being reusable if the second shared key is between the host and a third host other than the second host; and calculating an IKE encryption key based on the public key recorded in the key exchange payload of the first packet if the pair of Diffie-Hellman keys are determined as being reusable, wherein the determining whether the pair of Diffie-Hellman keys are reusable comprises determining whether a number of times the pair of Diffie-Hellman keys have been used exceeds a predetermined maximum number; and determining whether the pair of Diffie-Hellman keys have already been used by the third host unless the number of times the pair of Diffie-Hellman keys have been used exceeds the predetermined maximum number, wherein, the pair of Diffie-Hellman keys are reused if the pair of Diffie-Hellman keys have not yet been used by the third host.

17. A non-transitory computer-readable recording medium, on which a program enabling an Internet key exchange (IKE) response method is recorded, the IKE response method comprising:

determining whether a pair of Diffie-Hellman keys that have already been used in calculating a first shared key between the host and a second host are reusable in calculating a second shared key, wherein the pair of Diffie-Hellman keys are determined as being reusable if the second shared key is between the host and a third host other than the second host;

reading the pair of Diffie-Hellman keys if the pair of Diffie-Hellman keys are determined as being reusable; and calculating an IKE encryption key based on the read pair of Diffie-Hellman keys between the host and the third host, wherein the determining whether the pair of Diffie-Hellman keys are reusable comprises determining whether a number of times the pair of Diffie-Hellman keys have been used exceeds a predetermined maximum number; and determining whether the pair of Diffie-Hellman keys have already been used by the third host unless the number of times the pair of Diffie-Hellman keys have been used exceeds the predetermined maximum number, wherein, the pair of Diffie-Hellman keys are reused if the pair of Diffie-Hellman keys have not yet been used by the third host.

18. A method of managing a cryptographic communication from a host system, comprising:

reusing pairs of public and private keys for communications between the host system and at least two other host systems until a number of times the public and private keys are reused exceeds a threshold, if the pairs of public and private keys can be used for host systems other than two host systems which previously used the pairs of public and private keys or for one of the two host systems and another host system, wherein the determining whether the pair of public and private keys are reusable comprises determining whether a number of times the pair of public and private keys have been used exceeds a predetermined maximum number; and determining whether the pair of public and private keys have already been used by the third host unless the number of times the pair of public and private keys have been used exceeds the predetermined maximum number, wherein, the pair of public and private keys are reused in the second encryption process if the pair of public and private keys have not yet been used by the third host.

19. The method of claim 18, wherein the pairs of public and private keys are used for communications according to a Diffie-Hellman key agreement protocol.

20. The method of claim 19, further comprising:
storing a table of the pairs of public and private keys;
counting a number of times each of the pairs of public and private keys have been reused; and
deleting from the table the stored pairs of public and private keys that the number of times exceeds the threshold.

21. The method of claim 19, further comprising:
generating a new pair of public and private keys when the other systems have previously used the pairs of public and private keys.

22. The method of claim 19, wherein the communications between the host system and the other host systems comprises encrypting the communications according to IPsec using Internet Key Exchange with the pairs of the public and private keys.

23. A non-transitory computer-readable recording medium, on which a program enabling a method of managing a cryptographic communication from a host system is recorded, the method comprising:

reusing pairs of public and private keys for communications between the host system and at least two other host systems until a number of times the public and private keys are reused exceeds a threshold, if the pairs of public and private keys can be used for host systems other than two host systems which previously used the pairs of public and private keys or for one of the two host systems and another host system, wherein the determining whether the pair of public and private keys are reusable comprises determining whether a number of times the pair of public and private keys have been used exceeds a predetermined maximum number; and determining whether the pair of public and private keys have already been used by the third host unless the number of times the pair of public and private keys have been used exceeds the predetermined maximum number, wherein, the pair of public and private keys are reused in the second encryption process if the pair of public and private keys have not yet been used by the third host.

* * * * *

UNITED STATES PATENT AND TRADEMARK OFFICE
CERTIFICATE OF CORRECTION

| | | |
|---|---|---|
| PATENT NO. | : 8,014,527 B2 | Page 1 of 1 |
| APPLICATION NO. | : 10/931053 | |
| DATED | : September 6, 2011 | |
| INVENTOR(S) | : Seong-min Kang | |

It is certified that error appears in the above-identified patent and that said Letters Patent is hereby corrected as shown below:

Column 12, Line 46, In Claim 4, delete "anew" and insert -- a new --, therefor.

Column 13, Line 25, In Claim 6, delete "reusable." and insert -- reusable, --, therefor.

Signed and Sealed this
Thirty-first Day of January, 2012

David J. Kappos
*Director of the United States Patent and Trademark Office*